(12) United States Patent
O Meachair et al.

(10) Patent No.: US 10,639,990 B2
(45) Date of Patent: May 5, 2020

(54) VIRTUAL FOOTREST APPARATUS

(71) Applicant: BENTLEY MOTORS LIMITED, Crewe (GB)

(72) Inventors: Deaglan O Meachair, Nantwich (GB); Gary Stephen Elliot, Whitchurch (GB)

(73) Assignee: Bentley Motors Limited, Crewe, Cheshire (GB)

( * ) Notice: Subject to any disclaimer, the term of this patent is extended or adjusted under 35 U.S.C. 154(b) by 0 days.

(21) Appl. No.: 16/310,415

(22) PCT Filed: Jun. 19, 2017

(86) PCT No.: PCT/GB2017/051780
§ 371 (c)(1),
(2) Date: Dec. 14, 2018

(87) PCT Pub. No.: WO2017/220981
PCT Pub. Date: Dec. 28, 2017

(65) Prior Publication Data
US 2019/0322172 A1 Oct. 24, 2019

(30) Foreign Application Priority Data
Jun. 24, 2016 (GB) .................................. 1611014.0

(51) Int. Cl.
*B60K 26/02* (2006.01)
*B60K 35/00* (2006.01)
(Continued)

(52) U.S. Cl.
CPC .............. *B60K 26/02* (2013.01); *B60K 35/00* (2013.01); *B60K 2026/026* (2013.01);
(Continued)

(58) Field of Classification Search
CPC ...... B60K 35/00; B60K 26/02; B60K 26/021; B60W 50/14; B60W 50/16; B60W 50/12; B60W 2050/146; G05G 1/38; G05G 5/06
See application file for complete search history.

(56) References Cited

U.S. PATENT DOCUMENTS 3,104,741 A * 9/1963 McDougal ............. B60K 31/02
477/189
5,238,080 A 8/1993 Fastie
(Continued)

FOREIGN PATENT DOCUMENTS

DE 102011108325 A1 * 2/2012 .............. F02D 11/02
EP 1155934 A2 11/2001
(Continued)

*Primary Examiner* — Luis A Gonzalez
(74) *Attorney, Agent, or Firm* — Schwabe Williamson & Wyatt, P.C.

(57) ABSTRACT

Apparatus for a vehicle is provided such that the throttle pedal can act as a virtual footrest. The apparatus comprises a pedal adapted to be depressed by a driver and a restriction mechanism adapted to restrict the displacement of the pedal. The apparatus also comprises a visual sign which enters a first illuminated state in response to activation of the footrest mode. The visual sign remains in the first illuminated state whilst the restriction mechanism retains the pedal in the footrest position, and is extinguished when footrest mode or cruise control is cancelled. The visual sign enters a second illuminated state when the pedal is subjected to a force greater than a first threshold value, so as to push the pedal past through the footrest position whilst in the footrest mode.

18 Claims, 4 Drawing Sheets

(51) Int. Cl.
  *B60W 50/14* (2020.01)
  *G05G 1/38* (2008.04)
  *G05G 5/06* (2006.01)
(52) U.S. Cl.
  CPC ...... *B60K 2310/20* (2013.01); *B60K 2310/28* (2013.01); *B60Y 2300/14* (2013.01); *G05G 1/38* (2013.01); *G05G 5/06* (2013.01); *G05G 2505/00* (2013.01)

(56) References Cited

U.S. PATENT DOCUMENTS

| | | | |
|---|---|---|---|
| 6,542,793 B2 * | 4/2003 | Kojima | .................. B60T 7/042 180/170 |
| 7,706,953 B1 | 4/2010 | Sun | |
| 2016/0368376 A1 * | 12/2016 | Lepczyk | ............... B60W 50/16 |

FOREIGN PATENT DOCUMENTS

| | | | | | |
|---|---|---|---|---|---|
| EP | 1179460 | A2 | | 2/2002 | |
| EP | 2384921 | A1 | | 11/2011 | |
| JP | 04151336 | A | * | 5/1992 | |
| JP | 2000054860 | A | * | 2/2000 | |
| JP | 2006182139 | A | | 7/2006 | |
| JP | 2010052468 | A | * | 3/2010 | |
| JP | 2010058549 | A | | 3/2010 | |
| JP | 2012207974 | A | * | 10/2012 | ............. B60K 35/00 |

\* cited by examiner

VIRTUAL FOOTREST APPARATUS

CROSS-REFERENCE TO RELATED APPLICATION

This application is a 371 U.S. National Stage of International Application No. PCT/GB2017/051780, filed Jun. 19, 2017, entitled "VIRTUAL FOOTREST APPARATUS," which designated, among the various States, the United States of America, and which claims priority to GB 1611014.0, filed Jun. 24, 2016, both of which are hereby incorporated by reference.

TECHNICAL FIELD OF THE INVENTION

The present invention relates to an apparatus for adapting a pedal response according to different driving modes, in particular to an apparatus for increasing the reaction force of a pedal when cruise-control is engaged, such that the pedal may serve as a footrest. The invention is especially, but not exclusively related to pedals in vehicles and in most especially in automobiles.

BACKGROUND TO THE INVENTION

Whilst they have not become popular in production automobiles, the concept of "virtual footrests", i.e. a pedal acting as a footrest during cruise control has been in the public domain for some time. For example, EP 2 384 921 B1 (Volvo Car Corporation) published in 2012 proposes a pedal device for a vehicle. The pedal device comprises a pedal adapted to be depressed by a driver by means of a force, and a restriction means adapted to restrict the displacement of the pedal in the depression direction. When the vehicle is in a cruise control mode, the restriction means is adapted to retain the pedal in a rest position when the pedal is subjected to a force less than or equal to a predetermined first threshold value and thereby act as a footrest. The restriction means is further adapted to allow depressing of the pedal away from the rest position when the pedal is subjected to a force greater than the first threshold value; i.e. a driver can push through the footrest position to accelerate. The pedal device is arranged such that after having exceeded the first threshold value, the force required to depress the pedal reduces gradually as a function of further displacement for at least a part of the further displacement.

The inventors posit that the reason this technology has not reached the market may be because of its unfamiliarity to drivers and perhaps potential confusion as to whether the footrest mode is activated, or not and/or difficulty in accurately controlling the speed of the vehicle when pushing through the footrest mode.

The present invention therefore seeks to provide an improved "virtual footrest".

SUMMARY OF THE INVENTION

According to a first aspect of the invention there is provided an apparatus for a vehicle comprising a pedal adapted to be depressed by a driver by means of a force and a restriction mechanism adapted to restrict the displacement of the pedal in the depressive direction, wherein, when the vehicle is in a cruise control mode, the restriction mechanism is operable to enter a footrest mode, which increases the force required to depress the pedal and thereby retains the pedal in a rest position when the pedal is subjected to a force less than or equal to a predetermined first threshold value, but allows depressing of the pedal away from said rest position when the pedal is subjected to a force greater than the first threshold value; wherein the apparatus comprises a visual sign which enters a first illuminated state in response to activation of the footrest mode; the visual sign remaining in the first illuminated state whilst the restriction mechanism retains the pedal in the rest position, the visual sign being extinguished when footrest mode, or cruise control is cancelled and the visual sign entering a second illuminated state when the pedal is subjected to a force greater than the first threshold value, whilst in the footrest mode.

The first illuminated state may be a static illuminated state in a first colour and the second illuminated state may be a flashing state, and/or an illuminated state in a different colour.

Provision of a visual indication that the footrest mode has been activated is useful in avoiding confusion as to the state of the apparatus, but providing a second illuminated state when the pedal has been pushed past the footrest threshold is especially useful in alerting the driver to the different characteristics of the pedal that may be encountered in this transitional state.

The visual sign may enter a second illuminated state when the pedal is subjected to a force greater than the first threshold value and passes a first threshold position, whilst in the footrest mode. The first threshold position may be beyond the rest position. This can avoid a change in state in response to only a small movement, e.g. an accidental movement insufficient and not intended to alter the vehicle response.

The apparatus may be operable to extinguish the visual illumination if the pedal remains beyond the first threshold position for a predetermined period and may simultaneously cancel the cruise control and footrest modes.

The apparatus may be operable to return to the first illuminated state if the pedal returns to the rest position within the predetermined period, to indicate that the footrest and cruise control modes remain active.

The apparatus may be operable to cancel footrest mode whilst maintaining the cruise control mode, e.g. in response to operation of a switch. The apparatus may likewise be operable to enter footrest mode only in response to operation of a switch.

The apparatus may be operable to cancel cruise control mode (and footrest mode) in response to driver intervention with a cruise control switch, driver intervention on the brake pedal or clutch, or vehicle intervention (e.g. autopilot).

The pedal may be a throttle pedal. The throttle pedal may be a floor mounted throttle pedal.

The visual sign may be a tell-tale, which may be provided on a dashboard and may be provided adjacent a sign indicating the cruise control status. The visual sign may comprise an image of a foot or shoe.

The apparatus may be arranged such that after having exceeded the first threshold value, the force required to depress the pedal increases along the entire extent of the displacement of the pedal. Especially in a performance automobile, in which throttle response may be sharp, even in a high gear at motorway speeds, the inventors consider that any reduction in force required to depress the pedal after pushing through the footrest threshold could lead to a lack of control. Requiring an ever greater force to depress the pedal, whilst alerting the driver to the unusual characteristic of the pedal by means of the second illuminated state of the visual sign, should educate and familiarize the driver with the concept of a virtual footrest.

Over the course of a predetermined period, during which the pedal is depressed beyond the first threshold position, the force required to maintain the pedal in position may be reduced (e.g. gradually reduced), such that the force required to depress the pedal returns to a "normal" level at such a time as the visual illumination is extinguished and the cruise control and footrest modes are cancelled.

Those skilled in the art will appreciate that the "normal" level of force required to depress the pedal varies between automobiles, and may not be a constant force: displacement ratio; for example force required increases at "kick-down". However, the "normal" force/displacement curve or line, will always allow the pedal to be depressed with a force lower than the first threshold value, which the restriction mechanism creates.

The predetermined period may be between 5 seconds and 1 minute, for example between 10 and 30 seconds, e.g. about 20 seconds.

A second aspect of the invention provides an apparatus for a vehicle comprising a pedal adapted to be depressed by a driver by means of a force and a restriction mechanism adapted to restrict the displacement of the pedal in the depressive direction, wherein, when the vehicle is in a cruise control mode, the restriction mechanism is operable to enter a footrest mode, which increases the force required to depress the pedal and thereby retains the pedal in a rest position when the pedal is subjected to a force less than or equal to a predetermined first threshold value, but allows depressing of the pedal away from said rest position when the pedal is subjected to a force greater than the first threshold value; wherein after having exceeded the first threshold value, the force required to depress the pedal increases along the entire extent of the displacement of the pedal.

That is to say that the feature that after having exceeded the first threshold value, the force required to depress the pedal increases along the entire extent of the displacement of the pedal is considered to be inventive even in the absence of the visual sign. Any of the optional features of the first aspect of the invention may be provided in the second aspect of the invention.

The invention also extends to a vehicle, in particular an automobile comprising the apparatus of the first or second aspect of the invention.

DETAILED DESCRIPTION OF THE INVENTION

In order that the invention may be more clearly understood an embodiment thereof will now be described, by way of example only, with reference to the accompanying drawings, of which:

Figure 1:
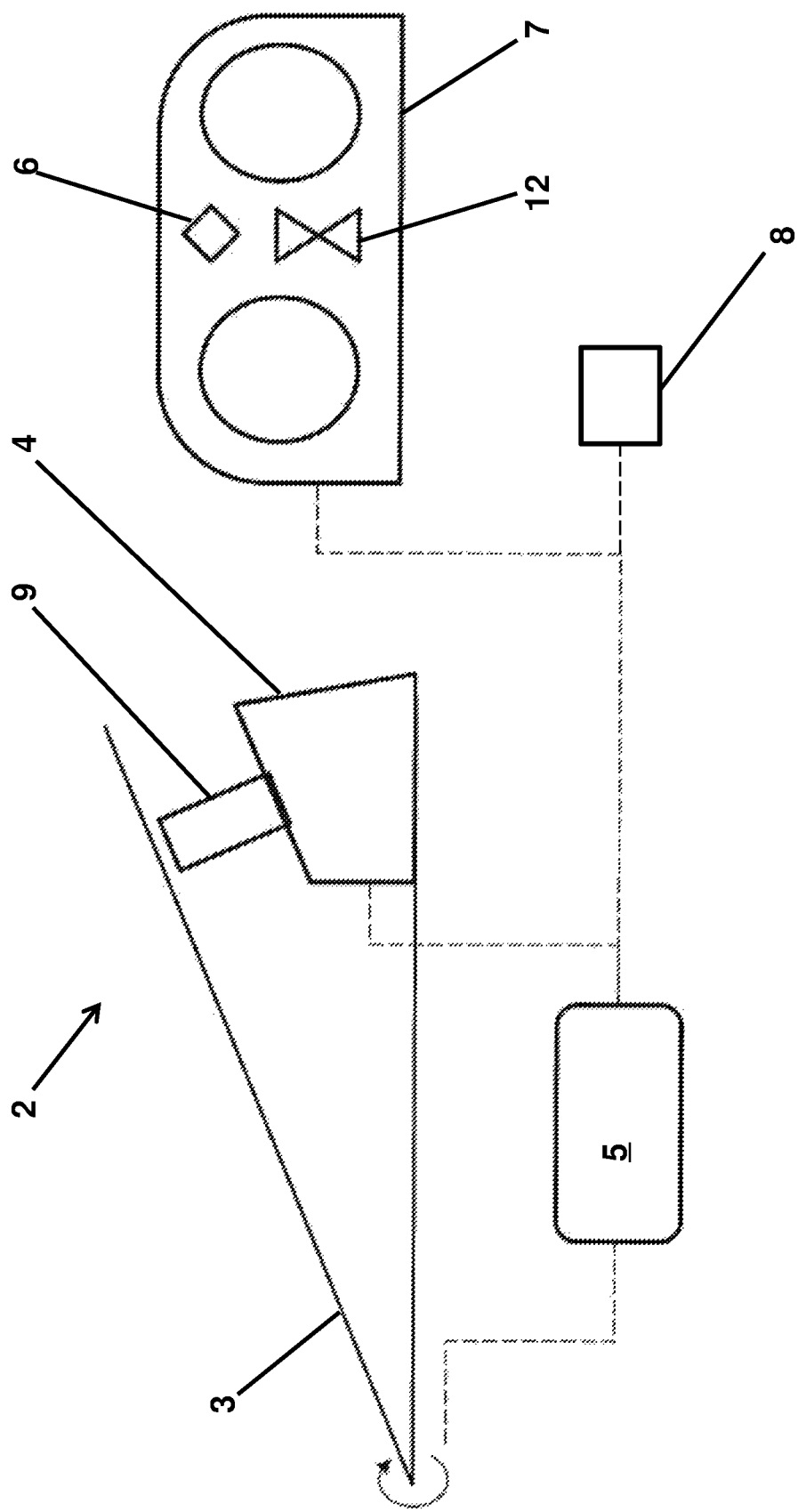
FIG. 1 shows a schematic diagram of the apparatus according to the invention.
Figure 2:
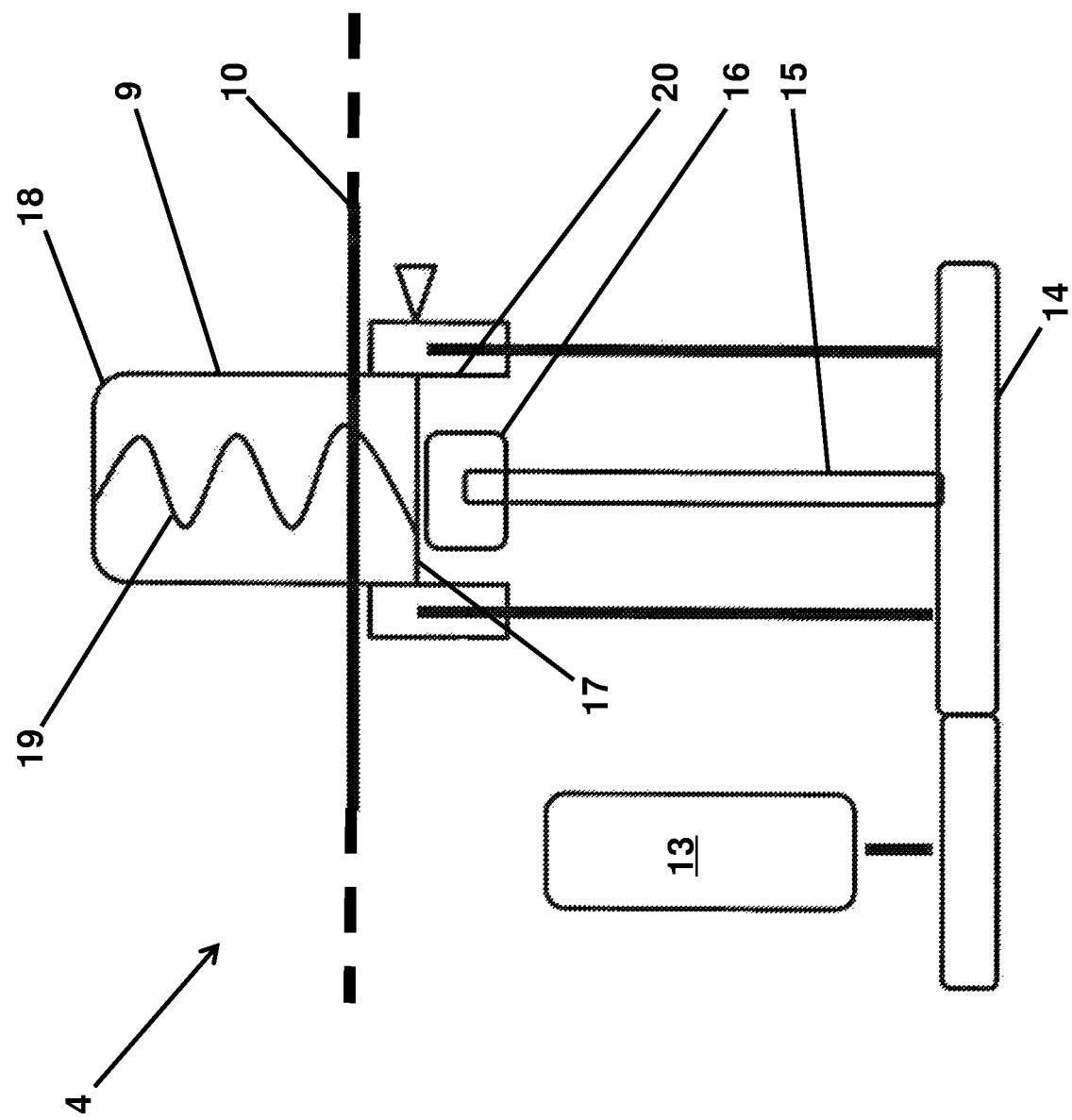
FIG. 2 shows a schematic diagram of an exemplary restriction mechanism for increasing the force required to depress the pedal.
Figure 4:
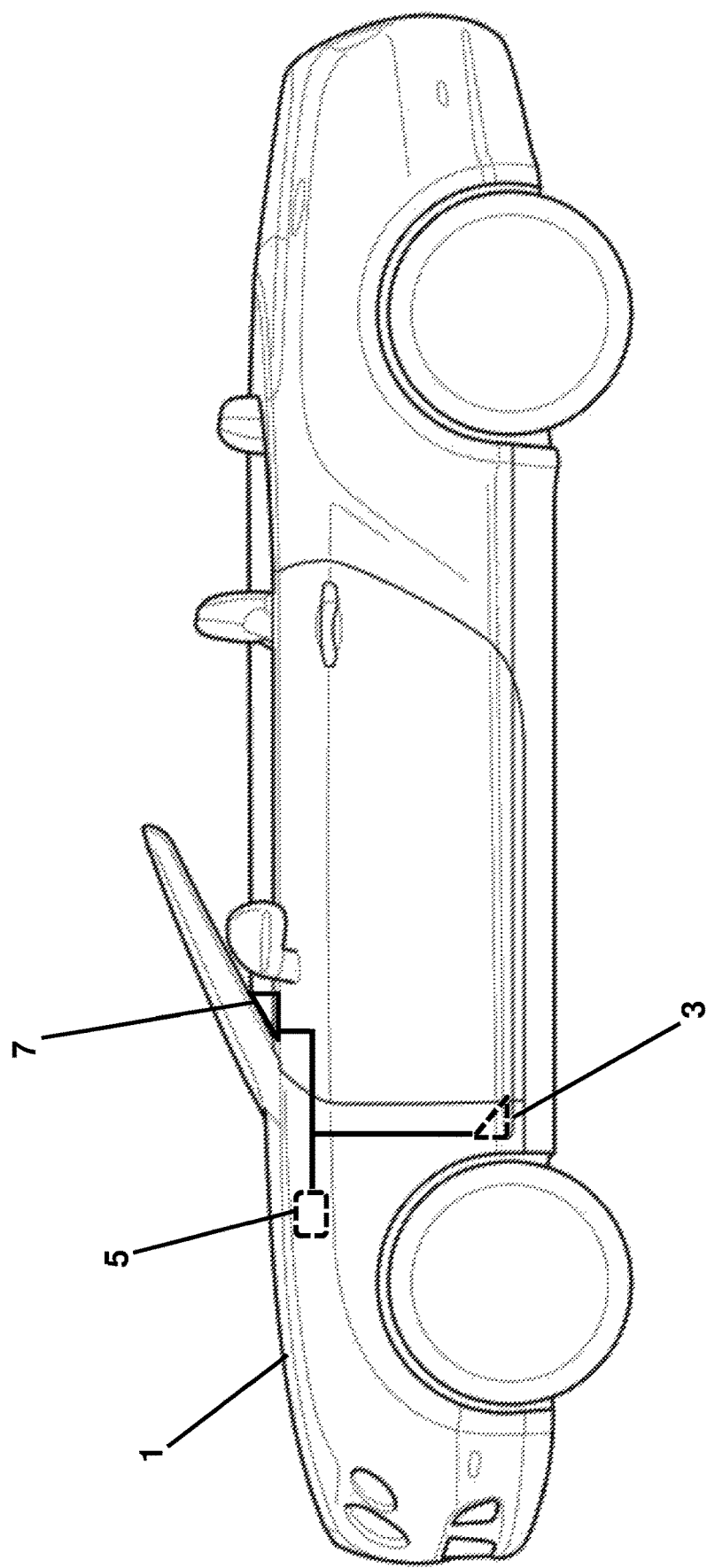
FIG. 4 shows an automobile comprising the apparatus of FIGS. 1 and 2.

Referring to FIGS. 1, 2 and 4, an automobile 1 comprises apparatus 2 for providing a "virtual footrest" function. The apparatus comprises a pedal device 3, a restriction mechanism 4 (an embodiment of which is shown in detail in FIG. 2), an electronic control unit 5, which in practice could be a dedicated unit as shown, or formed in software in an existing control unit, and a visual sign 6 provided in the dashboard 7.

Those skilled in the art will appreciate that whilst the pedal device 3 is shown as a floor-mounted throttle pedal, which is the preferred device, the invention could be used with other types of pedal device.

The electronic control unit 5 is operably connected to the pedal device 3, the restriction mechanism 4 and the dashboard 7, as well as a switch 8, so as to send and receive signals as necessary.

The restriction mechanism 4 includes a deployable element 9, which under normal operation is withdrawn into the housing 10 of the restriction mechanism 4, so as not to interfere with the arc of the throttle movement—allowing free movement between a rest position and a full throttle position.

The position of the deployable element is controlled by the electronic control unit 5, which monitors throttle angle (and thereby throttle position), position of the cruise control/footrest mode switch 8, position of a brake pedal (not shown) and is arranged to receive further inputs from the vehicle 1, e.g. from an autopilot subsystem (not shown).

Figure 3:
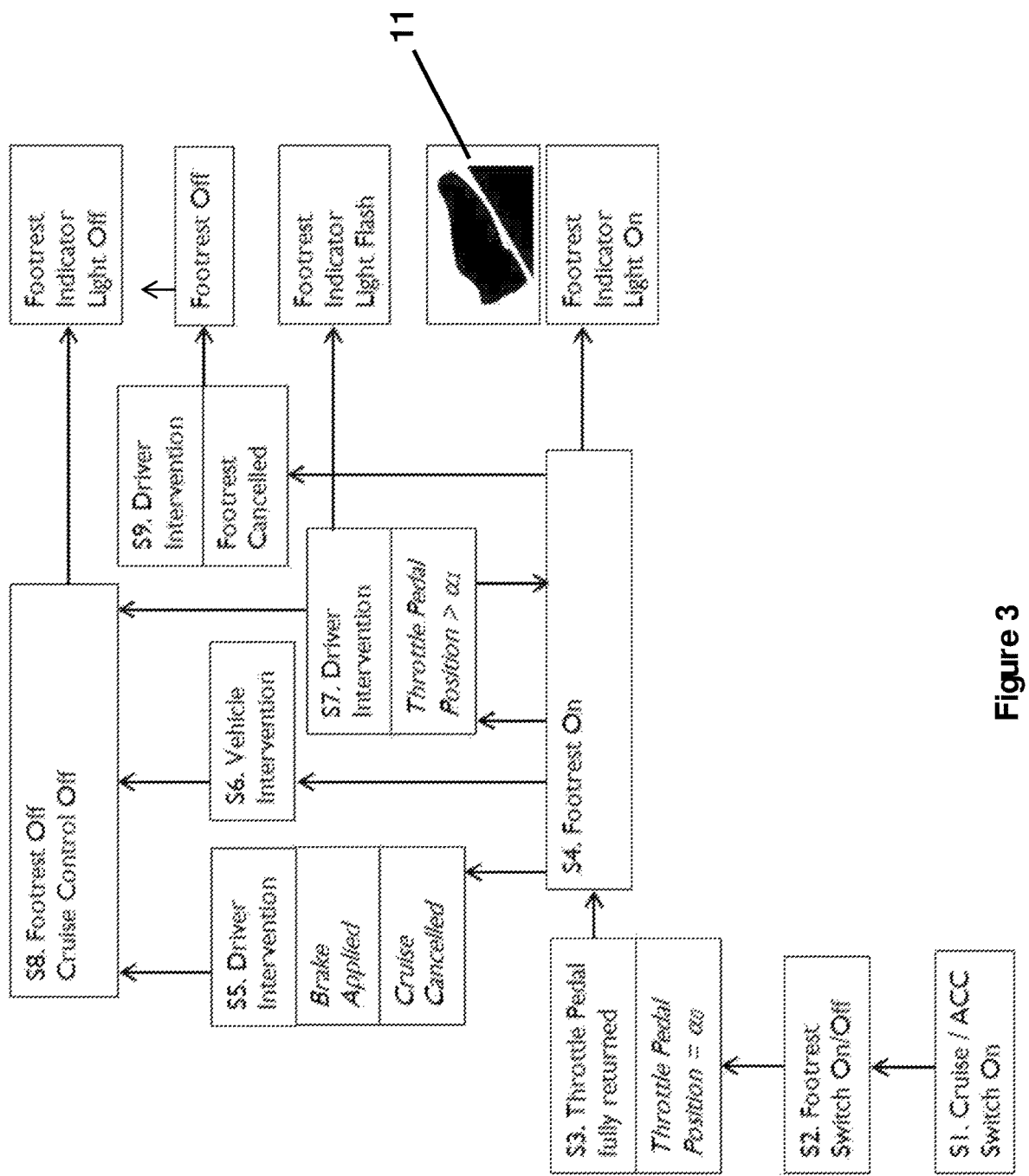
FIG. 3 shows a flow chart indicative of the control logic of the apparatus.

As set out above, the electronic control unit 5 is also in communication with the dashboard 7, so as to illuminate the visual sign 6 (to display a tell-tale 11 shown in FIG. 3 showing a foot at rest) and optionally a cruise control indicator 12.

The deployable element 9 is arranged such that, when deployed, it offers a resistance to throttle movement, which can be overcome if sufficient force is applied to the throttle. Consequently, when deployed, the initial resistance against the force required to depress the throttle pedal 3 is increased, so as to provide a footrest function, but once overcome, additional force can further depress the throttle pedal 3 between the rest position and full throttle.

In the specific embodiment of this invention restriction mechanism 4, the deployable element 9 comprises a casing 18 which is extendable through an aperture in the housing 10. An electric motor 13 is operable in response to a signal from the electronic control unit 5 to drive a spindle 14, which in turn rotates a worm gear drive 15, so as to raise or lower a worm gear carrier 16 coupled to the drive. The worm gear carrier 16 supports a sliding platform 17 which is likewise raised or lowered in response to movement of the electric motor 13. The casing 18 of the deployable element 9 is mounted on the sliding platform by a resilient member 19 in the form of a helical compression spring, attached at one end to the sliding platform and at the other end to the inside of the top of the casing 18. The casing 18 is hollow, and mounted so as to be slidable downwards over the sliding platform 17, against the spring bias. A guide channel 20 is provided in the housing 10, so as to guide the casing as it moves upwards and downwards (either in tandem with the sliding platform 17 as the carrier 16 moves, or relative to the sliding platform 17, against the bias of the resilient member 19.

With reference to FIG. 3 and the other figures, in use, in step S1, the driver turns on cruise control (or adaptive/autonomous cruise control ACC). This may be by switching switch 8, or another input and will illuminate the cruise control indicator 12 as is conventional. The ECU 5 may interpret this as automatically activating the virtual footrest, or alternatively in step S2, the ECU 5 may await a switch 8 being turned on, to activate the virtual footrest mode. As set out above, the ECU 5 monitors the position of the throttle pedal 3 (by monitoring its angle) and when the position is the rest position ao (i.e. the position to which the pedal returns when no force is applied to it), as shown in step S4, the virtual footrest function is turned on.

As the footrest function is turned on, the ECU 5 sends a signal to the dashboard 7 illuminating the virtual footrest tell-tale 11 in a first illumination state (e.g. a static state). Simultaneously, the ECU 5 sends a signal to the restriction mechanism 4 to engage the footrest mode which increases the force required to depress the pedal 3 and thereby retains the pedal 3 in a rest position when the pedal 3 is subjected to a force less than or equal to a predetermined first threshold value sufficient to act as a footrest and support the driver's foot. This is achieved in this embodiment by the electric motor 13 causing the deployment element 9 to rise.

The footrest function can be disengaged either by driver intervention, or by vehicle intervention.

Perhaps most typically, the footrest function will be cancelled by driver interaction, with the driver cancelling cruise control either by pressing the brake pedal or switching off cruise control at a switch as shown in step S5. In this case, in step S8, the cruise control will be turned off in the usual fashion, and the ECU 5 will receive a signal indicating the same, in consequence the ECU will send a signal to the restriction mechanism 4 to quickly retract the deployable element 9 (e.g. over the course of one or two seconds) and will send a signal to the dashboard 7 to extinguish the footrest sign 6. Consequently, when the driver presses on the pedal 3, it will react in the normal fashion.

Alternatively, the footrest function may be cancelled by vehicle interaction as shown in step S6, for example, an autopilot may hand over control to the driver for one reason or another. Again this would lead to step S8, in which the cruise control will be turned off in the usual fashion, and the ECU 5 will receive a signal indicating the same, in consequence the ECU will send a signal to the restriction mechanism 4 to quickly (e.g. over the course of one or two seconds) retract the deployable element 9, and will send a signal to the dashboard 7 to extinguish the footrest sign 6. Consequently, when the driver presses on the pedal 3, it will react in the normal fashion.

In another situation, the driver may decide to accelerate from the footrest position. In this case, the pedal 3 will be depressed against the deployable element 9 and the spring bias provided by the resilient member 19, because the pedal 3 must be pushed against the spring bias of the deployable element 19, in addition to the usual bias of the pedal 3, the force required to depress the pedal increases along the entire extent of depression of the pedal. The extent of the increase can of course be tuned by tuning the spring constant of the compression spring.

In this case, illustrated as step S7, the ECU will determine when the throttle pedal passes a position $\alpha_1$ (which may be a few degrees beyond the rest position to avoid any inadvertent response to an accidental knock) and will send an intermittent signal to the dashboard 7 to cause the footrest sign 6 to flash (alternatively the footrest sign could change colour, or display a different message). At the same time a timer would be initiated to countdown a predetermined period, e.g. 20 seconds. Over the course of the predetermined period, providing the ECU 5 determines that the throttle pedal 3 remains beyond position $\alpha_1$, the footrest sign 6 continues to display the second illuminated state (e.g. flashing) and at the same time, the motor gradually lowers the deployable element, over the course of the predetermined period, or at least slowly, e.g. over the course of 10 seconds rather than 1 or two seconds, with the retraction being a function of time and irrespective of the position of the throttle pedal.

In this way, the driver is alerted to the fact that he is in a transitional mode by the flashing of the tell-tale 11 and the throttle response will gradually return to normal without any potentially confusing or dangerous changes in force required to depress the pedal along the length of travel.

Finally, the footrest mode could of course be cancelled as shown in step S9 by the driver simply turning off the footrest mode whilst leaving cruise control active. In this case, the deployable element 9 would again be quickly retracted and the footrest indicator turned off, but the cruise control system would not be affected.

The above embodiment is described by way of example only. Many variations are possible without departing from the scope of the invention as defined in the appended claims.

The invention claimed is:

1. An apparatus for a vehicle, comprising:
a pedal adapted to be depressed by a driver by means of a force; and
a restriction mechanism adapted to restrict the displacement of the pedal in the depressive direction, wherein, when the vehicle is in a cruise control mode, the restriction mechanism is operable to enter a footrest mode, which increases the force required to depress the pedal and thereby retains the pedal in a rest position when the pedal is subjected to a force less than or equal to a predetermined first threshold value, but allows depressing of the pedal away from said rest position when the pedal is subjected to a force greater than the first threshold value;
wherein the apparatus comprises a visual sign which enters a first illuminated state in response to activation of the footrest mode;
the visual sign remaining in the first illuminated state whilst the restriction mechanism retains the pedal in the rest position, the visual sign being extinguished when footrest mode, or cruise control is cancelled; and
wherein the apparatus comprises a controller to control the visual sign to enter a second illuminated state when the pedal is subjected to a force greater than the first threshold value and passes a first threshold position, whilst in the footrest mode, the first threshold position being beyond the rest position.

2. An apparatus according to claim 1 wherein the first illuminated state is a static illuminated state and/or is illuminated in a first colour and the second illuminated state is a flashing state, and/or is illuminated in a different colour.

3. An apparatus according to claim 1 which is operable to extinguish the visual sign if the pedal remains beyond the first threshold position for a predetermined period.

4. An apparatus according to claim 3 which simultaneously cancels the cruise control and footrest modes when the visual illumination is cancelled.

5. An apparatus according to claim 3 which is operable to return to the first illuminated state if the pedal returns to the rest position within the predetermined period, to indicate that the footrest and cruise control modes remain active.

6. An apparatus according to claim 3 wherein over the course of a predetermined period, during which the pedal is depressed beyond the first threshold position, the force required to maintain the pedal in position is reduced, such that the force required to depress the pedal is normal by the time that the visual illumination is extinguished and the cruise control and footrest modes are cancelled.

7. An apparatus according to claim 3 wherein the predetermined period is between 10 and 30 seconds.

8. An apparatus according to claim 3 wherein the predetermined period is between 5 seconds and 1 minute.

9. An apparatus according to claim 3 wherein the predetermined period is about 20 seconds.

10. An apparatus according to claim 1 which is operable to cancel footrest mode whilst maintaining the cruise control mode.

11. An apparatus according to claim 1 which is operable to enter footrest mode only in response to operation of a switch.

12. An apparatus according to claim 1 which is operable to cancel cruise control mode and footrest mode in response to driver intervention with a cruise control switch, driver intervention on the brake pedal or clutch, and/or in response to vehicle intervention.

13. An apparatus according to claim 1 wherein the pedal is a floor mounted throttle pedal.

14. An apparatus according to claim 1 wherein the visual sign is a tell-tale, provided on a dashboard.

15. An apparatus according to claim 1 arranged such that after having exceeded the first threshold value, the force required to depress the pedal increases along the entire extent of the displacement of the pedal.

16. An apparatus according to claim 1 wherein the pedal is a throttle pedal.

17. An apparatus according to claim 1 wherein the visual sign comprises an image of a foot or a shoe.

18. An automobile, comprising:
an apparatus for a vehicle, the apparatus comprising
  a pedal adapted to be depressed by a driver by means of a force, and
  a restriction mechanism adapted to restrict the displacement of the pedal in the depressive direction, wherein, when the vehicle is in a cruise control mode, the restriction mechanism is operable to enter a footrest mode, which increases the force required to depress the pedal and thereby retains the pedal in a rest position when the pedal is subjected to a force less than or equal to a predetermined first threshold value, but allows depressing of the pedal away from said rest position when the pedal is subjected to a force greater than the first threshold value;
wherein the apparatus comprises a visual sign which enters a first illuminated state in response to activation of the footrest mode;
the visual sign remaining in the first illuminated state whilst the restriction mechanism retains the pedal in the rest position, the visual sign being extinguished when footrest mode, or cruise control is cancelled; and
wherein the apparatus comprises a controller to control the visual sign to enter a second illuminated state when the pedal is subjected to a force greater than the first threshold value and passes a first threshold position, whilst in the footrest mode, the first threshold position being beyond the rest position.

\* \* \* \* \*